United States Patent
Reichel

(10) Patent No.: US 11,911,968 B2
(45) Date of Patent: Feb. 27, 2024

(54) METHOD FOR COOLING AND COOLING DEVICE

(71) Applicant: EOS GmbH Electro Optical Systems, Krailling (DE)

(72) Inventor: Thomas Reichel, Germering (DE)

(73) Assignee: EOS GmbH Electro Optical Systems, Krailling (DE)

( * ) Notice: Subject to any disclaimer, the term of this patent is extended or adjusted under 35 U.S.C. 154(b) by 197 days.

(21) Appl. No.: 16/628,141

(22) PCT Filed: Jun. 12, 2018

(86) PCT No.: PCT/EP2018/065543
§ 371 (c)(1),
(2) Date: Jan. 2, 2020

(87) PCT Pub. No.: WO2019/007647
PCT Pub. Date: Jan. 10, 2019

(65) Prior Publication Data
US 2020/0223140 A1    Jul. 16, 2020

(30) Foreign Application Priority Data

Jul. 4, 2017 (DE) .......................... 102017211381.2

(51) Int. Cl.
*B29C 64/364* (2017.01)
*B29C 64/153* (2017.01)
(Continued)

(52) U.S. Cl.
CPC ............ *B29C 64/364* (2017.08); *B22F 10/28* (2021.01); *B22F 10/32* (2021.01); *B22F 12/20* (2021.01);
(Continued)

(58) Field of Classification Search
CPC ........ B22F 10/20; B22F 12/00; B29C 64/153; B29C 64/188; B29C 64/20; B29C 64/357;
(Continued)

(56) References Cited

U.S. PATENT DOCUMENTS 4,818,562 A * 4/1989 Arcella .................. C23C 26/02
118/DIG. 5
5,730,925 A 3/1998 Mattes et al.
(Continued)

FOREIGN PATENT DOCUMENTS

DE          19514740       4/1996
DE          19937260       2/2001
(Continued)

OTHER PUBLICATIONS

International Search Report for Application No. PCT/EP2018/065543, dated Sep. 14, 2018, 15 pages.

*Primary Examiner* — Yunju Kim
(74) *Attorney, Agent, or Firm* — Polsinelli

(57) ABSTRACT

Method for cooling a three-dimensional object manufactured by layer-wise selective solidification of a pulverulent building material and non-solidified building material in which the three-dimensional object is embedded by a treatment with a fluid medium. The fluid medium is constituted by a carrier gas that is specifically enriched with an additional component which comprises a further gas and/or a liquid and/or by a gas mixture from which specifically at least one mixture components is at least partially withdrawn.

19 Claims, 5 Drawing Sheets

(51) Int. Cl.
*B29C 64/357* (2017.01)
*B22F 10/28* (2021.01)
*B22F 10/32* (2021.01)
*B22F 12/20* (2021.01)
*B22F 12/70* (2021.01)
*B22F 10/73* (2021.01)
*B33Y 10/00* (2015.01)
*B33Y 30/00* (2015.01)
*B33Y 40/20* (2020.01)
*B29C 35/16* (2006.01)

(52) U.S. Cl.
CPC .......... *B22F 12/70* (2021.01); *B29C 64/153* (2017.08); *B29C 64/357* (2017.08); *B33Y 10/00* (2014.12); *B33Y 30/00* (2014.12); *B33Y 40/20* (2020.01); *B22F 10/73* (2021.01); *B29C 2035/1658* (2013.01); *B29C 2035/1691* (2013.01)

(58) Field of Classification Search
CPC ............ B29C 64/364; B29C 64/379; B29C 2035/1658; B29C 2035/1691; B29C 35/16; B33Y 10/00; B33Y 30/00; B33Y 40/00; B33Y 99/00; Y02P 10/25
See application file for complete search history.

(56) References Cited

U.S. PATENT DOCUMENTS

| | | | |
|---|---|---|---|
| 6,932,935 | B1 | 8/2005 | Oberhofer et al. |
| 2004/0138344 | A1 | 7/2004 | Allen et al. |
| 2006/0118532 | A1 | 6/2006 | Chung et al. |
| 2010/0155985 | A1 | 6/2010 | McAlea et al. |
| 2014/0079916 | A1* | 3/2014 | Grebe .................... B29C 35/16 264/497 |
| 2015/0258744 | A1 | 9/2015 | Muller et al. |
| 2015/0367415 | A1* | 12/2015 | Buller .................... C22C 38/02 419/53 |
| 2016/0107263 | A1 | 4/2016 | Koerber |
| 2018/0297284 | A1* | 10/2018 | Fulop ................... B29C 64/165 |

FOREIGN PATENT DOCUMENTS

| | | |
|---|---|---|
| DE | 60303275 | 10/2006 |
| DE | 102013212620 | 12/2014 |
| DE | 102014000415 | 7/2015 |
| DE | 102012106141 | 4/2018 |
| EP | 2708348 | 3/2014 |
| WO | 2018133991 | 7/2018 |

* cited by examiner

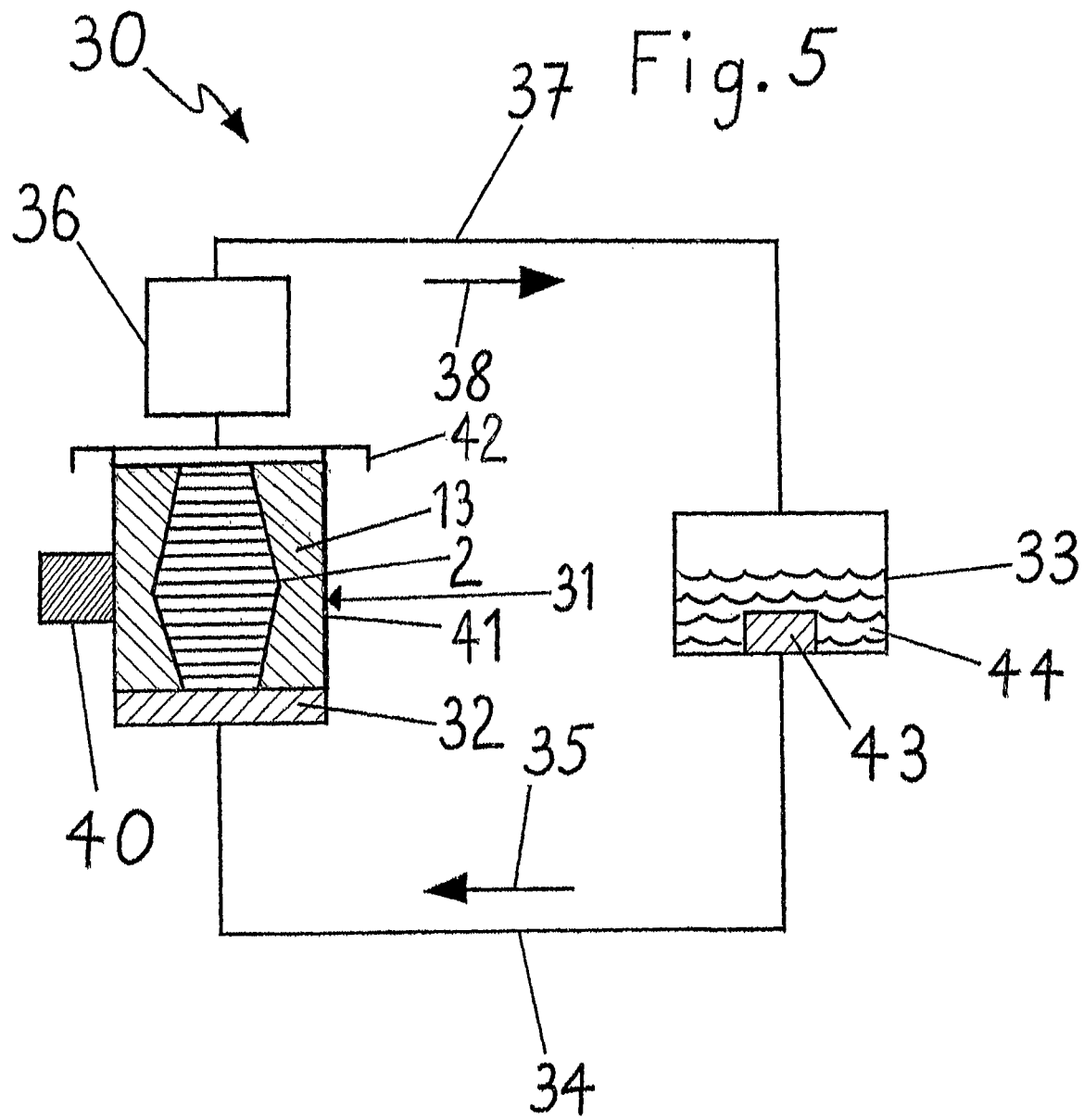

dimensional object manufactured by layer-wise selective solidification of a pulverulent building material and non-solidified building material in which the three-dimensional object is embedded as well as a corresponding cooling device.

BACKGROUND OF THE INVENTION

Methods and devices for manufacturing a three-dimensional object by layer-wise selective solidification of a pulverulent building material are for instance used for rapid prototyping, rapid tooling, or additive manufacturing. One example of such a method is known under the name "selective laser sintering" or "selective laser melting". Herein, a thin layer of a pulverulent building material is repeatedly applied, and the building material in each layer is selectively solidified by selectively irradiating of positions corresponding to a cross-section of the object to be manufactured with a laser beam.

The document DE 195 14 740 C1 describes a method for manufacturing a three-dimensional object by selective laser sintering or selective laser melting as well as a device for executing this method.

After the manufacture of the three-dimensional object, the three-dimensional object and the non-solidified powder in which the three-dimensional object is embedded are cooled. In US 2010/0155985 A1, it is proposed that a cooling fluid, e.g. nitrogen, is led through the powder cake which incorporates the manufactured object in order to quickly cool the same.

SUMMARY OF THE INVENTION

It is an object of the invention to provide an alternative and/or improved method and an alternative and/or improved device, respectively, for cooling a three-dimensional object manufactured by layer-wise selective solidification of a pulverulent building material and non-solidified building material in which the three-dimensional object is embedded.

This object is achieved by a method according to claim 1 and a device according to claim 11. Herein, the method according to the invention can also be further developed by features defined in the description below and the dependent claims, respectively, and directed at the device according to the invention and vice versa.

The method according to the invention is used for cooling a three-dimensional object manufactured by layer-wise selective solidification of a pulverulent building material and non-solidified building material in which the three-dimensional object is embedded by a treatment with a fluid medium. In doing so, the fluid medium is constituted by a carrier gas that is specifically enriched with an additional component which comprises a further gas and/or a liquid. The fluid medium may also be constituted by a gas mixture from which specifically at least one mixture components is at least partially withdrawn. By the inventive treatment with a fluid medium which is enriched with an additional component or which is obtained by the at least partial withdrawal of one or more mixture components from the gas mixture, for example the reusability of the non-solidified building material and/or the quality of a three-dimensional object that has been manufactured reusing at least partially non-solidified building material may be improved. A further advantageous effect which can be achieved thereby may for example be that the non-solidified building material can be handled more easily, especially sieved in a better way.

In the course of the inventive treatment, especially upon a fluid medium flowing through the power the cake preferably having the three-dimensional object located therein, the following effects may for instance be achieved:

By enriching the fluid medium with water vapour, for example a chemical effect may be achieved, if the building material contains a polymer. The water may for example cause that hydrolytic cleavage reactions occur in the polymer chains of the building material upon cooling, whereby the mean molar mass is reduced or an increase of the molar mass which would otherwise occur in the course of the manufacture of a three-dimensional object is at least partially compensated.

This may for example improve the reusability of the non-solidified building material and/or the quality of a three-dimensional object that has been manufactured reusing at least partially non-solidified building material.

By enriching the fluid medium with water vapour, for example a physical effect may be achieved in addition: By the treatment, a water shell may be generated as a result of which the power particles are separated from one another such that the agglutination of the powder particles is reduced or even prevented. In addition, the electrostatic charging of the particles is reduced or prevented. Accordingly, the non-solidified building material can as a result be handled more easily, especially it can be better sieved.

By enriching the fluid medium with a substance being suitable for the respective building material, for example also a surface improvement of the manufactured three-dimensional object may be achieved. For this purpose, the fluid medium may for example be enriched with an acid, preferably with a carboxylic acid, especially with formic acid and/or acetic acid.

Preferably, the additional component with which the carrier gas is specifically enriched comprises $H_2O$. Herein, the $H_2O$ content of the additional component is more preferably at least 90, even more preferably at least 95, particularly preferably at least 99 percent by weight. As a result of this enrichment with $H_2O$, for example the reusability and/or the ability to be sieved of the non-solidified building material may be increased in an especially effective manner because the non-solidified building material becomes less electrostatically charged or not electrostatically charged at all.

Preferably, the additional component comprises a surfactant. As a result, for example the wettability of the non-solidified building material for other ingredients of the additional component may be increased, whereby the advantageous effects of the inventive method described above may be enhanced. As surfactants for example ionic surfactants such as sodium lauryl sulphate, sodium dodecylbenzenesulfonate, sodium benzenesulfonate or non-ionic surfactants such as the surfactants commercialized under the tradename "Triton X" are taken into account.

Preferably, the carrier gas comprises an inert gas, in particular nitrogen. Using an inert gas, for example the above-mentioned advantageous effects and, simultaneously, protection against (thermo-)oxidative damages of the non-solidified building material may be achieved. As an alternative, also a different inert gas may be used, such as for example argon.

Preferably, the carrier gas is at least 50%, further preferably 80%, particularly preferably at least 90% saturated with the additional component at the current temperature and the current pressure. With such concentrations of the additional component, for instance the above-mentioned advantageous effects of the inventive method may be distinctively pronounced. It may, for instance, be useful in addition to intentionally heat the carrier gas in order to achieve a higher saturation of the carrier gas with the additional component.

Preferably, at least a part of the liquid is distributed in the fluid medium in the form of droplets. Then, the fluid medium is an aerosol. As a result, for example a particularly effective cooling action may be achieved because of the vaporization of the liquid. When the droplets contained in the fluid medium have vaporized, the fluid medium not an aerosol any more but a gaseous fluid medium.

Preferably, the fluid medium contains per cubic metre at least 10, preferably at least 50, more preferably at least 75 grams and/or no more than 300, preferably no more than 200, more preferably not more than 150 grams of the additional component. With such concentrations, for example the above-mentioned advantageous effects of the inventive method may be achieved in a particularly effective manner.

Preferably, the fluid medium flows through the non-solidified building material in which the three-dimensional object is embedded, wherein in a preferred embodiment the flow is made essentially from the bottom or, respectively, in a direction inverse to the force of gravity and/or having an angle with respect to the force of gravity. By the flow through the building material, it may for example be ensured that the fluid medium comes into close contact with the non-solidified building material, as a result of which the above-mentioned advantageous effects may be achieved in a particularly effective manner. If the flow is made in a substantially in a direction inverse to the force of gravity (from bottom to top) or in a direction having an angle with respect thereto which has at least a directional component inverse to the force of gravity, a lower pressure of the fluid medium is required and the requirements with respect to tightness of the apparatus are lower than in the case in which the direction of the flow substantially follows the force of gravity. In a further preferred embodiment, the flow is made substantially in the direction of the force of gravity. In doing so, it can be prevented, for instance, that non-solidified building material is carried off with the fluid medium.

Preferably, the non-solidified building material in which the three-dimensional object is embedded is at least partially fluidized with the aid of the fluid medium. By the fluidization, for example, it may be made easier or even, in the first place, it may be made possible that the fluid medium flows through the non-solidified building material. In practice, preferably, breaking the powder cake happens first and then the flow through the latter occurs. Both steps are performed with the same fluid medium.

Preferably, the fluid medium is led in the interior of a cooling container and brought into contact with the three-dimensional object and the non-solidified building material in the cooling container. In doing so, it may for instance be possible that the fluid medium flows through the non-solidified building material. Herein, the fluid medium is preferably led in the interior of the cooling container via a fluidization plate. With the aid of a fluidization plate, the non-solidified building material may for example be fluidized in an effective manner. For example a gas-permeable plate such as a perforated plate or a metal frit may be used as fluidization plate. In particular, a building container may be used as cooling container. In doing so, the manufactured three-dimensional object and the non-solidified building material in which the three-dimensional object is embedded may be withdrawn from an apparatus for manufacturing a three-dimensional object by layer-wise selective solidification of a pulverulent building material and put in a cooling device in a simple manner.

Preferably, the building material comprises a polymer, more preferably a polyaryletherketone and/or a polyamide, herein particularly preferably polyamide 12 and/or polyamide 11 and/or polyamide 6. By using such a building material, for instance the above-mentioned advantageous effects of the invention may be particularly pronounced. Usually, water only causes a change of material properties of a polymer material as long as it is present in the same. If the polymer material is subsequently dried, these changes of material properties are normally reversible. As mentioned above, the presence of water is advantageous for subsequent processes such as sieving.

In the context of the invention, it is also considered that the building material comprises at least one polymer which is selected from the group consisting of polyetherimides, polycarbonates, polyethersulfones, polypheylenoxides, polyethersulfulfones, acrylonitrile-butadiene-styrene copolymer, polyacrylates, polyesters, polyolefines, polypropylene, polyether block amide as well as their copolymers and their polymer blends.

Generally, after the manufacture of a three-dimensional object by layer-wise selective solidification of a pulverulent building material, there are significant amounts of non-solidified building material, such that it is economically and ecologically reasonable to reuse this so-called "old powder" as far as possible, i.e. to use it again for manufacturing a three-dimensional object. Usually, the old powder cannot be reused for manufacturing a three-dimensional object or it has to be mixed with a pulverulent building material that has not been used for manufacturing a three-dimensional object before (so-called "fresh powder") such that it can be reused. The percentual fraction of the fresh powder in such a powder mixture is called "refreshment rate".

Preferably, the carrier gas and/or the additional component and/or the building material are selected and/or adjusted to one another such that the refreshment rate of the building material is reduced. In this way, for example the consumption of building material may be reduced in an economically and ecologically advantageous manner.

The cooling device according to the invention serves to cool a three-dimensional object manufactured by layer-wise selective solidification of a pulverulent building material and non-solidified building material in which the three-dimensional object is embedded by a treatment with a fluid medium with a method according to the invention. The cooling device comprises a cooling container for the three-dimensional object and the non-solidified building material in which the three-dimensional object is embedded having a cooling container wall which has a border being in at least a portion permeable for the fluid medium, a preparation unit for preparing the fluid medium which in particular comprises a sprayer for spraying a liquid, and a first conduit for conducting the fluid medium from the preparation unit to the portion being permeable for the fluid medium. With such a cooling device, for example a device is available with which the method according to the invention can be carried out.

Preferably, the cooling device further comprises a second conduit for conducting the fluid medium from the cooling container to the preparation unit and a compressor for generating a circular flow of the fluid medium, wherein the circular flow goes through the cooling container, the second conduit, the preparation unit, and the first conduit. In this way, for example an economical use of the carrier gas and, in the case of an appropriate circular flow conduction, also an economical use of further components of the fluid medium is possible.

Preferably, the cooling device comprises a filter for filtering the fluid medium, wherein more preferably the filter is arranged such that it filters fluid medium coming out of the cooling container. In this way, it is for example possible that particles of the non-solidified building material being carried off with the fluid medium can be separated in order to avoid a contamination of the cooling device.

Preferably, the portion being permeable for the fluid medium forms at least a part of a bottom of the cooling container. In this way, it is for example possible, that the fluid medium is made flowing in a direction substantially inverse to the force of gravity acting on the powder particles of the non-solidified building material or in a direction which has an angle with respect thereto and which consequently has a directional component inverse to the force of gravity, whereby the non-solidified building material is loosened and made appropriate for the fluid medium to flow through it more easily. More preferably, the portion being permeable for the fluid medium is formed as fluidization plate. In this way, the non-solidified building material is loosened even better and it is made even easier for the fluid medium to flow through it.

Preferably, the cooling device comprises a shaking unit which is configured to cause the cooling container to move in a shaking motion. Preferably, the shaking unit is formed as vibrator, beater, or shaking plate. By a shaking motion, it may for instance be avoided that cracks and/or cavities are formed in the powder cake and it may be accomplished that cracks formed in the powder cake are closed by non-solidified building material trickling or flowing in the cracks. Experiments have shown that the frequency range of at least 25 Hz and/or not exceeding 40 Hz for the shaking motion may be advantageous for the purpose of an optimal crack prevention. The optimum frequency, however, is dependent on the object's geometry and as to be adjusted to the complexity or to delicate structures on a case-by-case basis. Solid objects often tolerate higher shaking frequencies than objects having a delicate structure.

BRIEF DESCRIPTION OF THE DRAWINGS

Features and expediencies of the invention follow from the description of embodiments with reference to the appended drawings.

FIG. 5 as a schematic view, partially represented as cross-section, of a cooling device according to a fourth embodiment of the present invention.

DETAILED DESCRIPTION OF THE EMBODIMENTS

Multiple embodiments of the present invention are described below with reference to the drawings.

Figure 1:
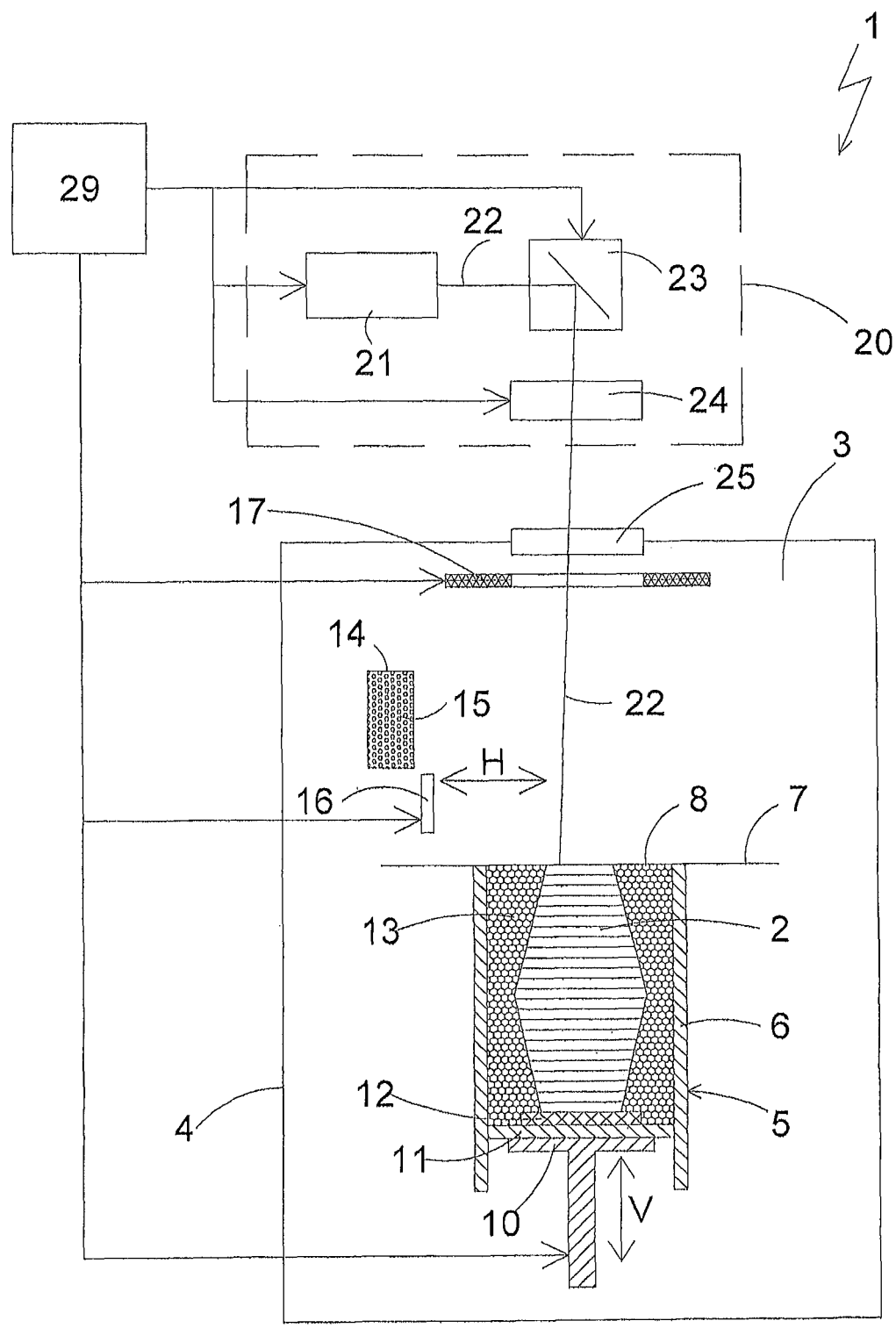
FIG. 1 is a schematic view, partially represented as cross-section, of a device for manufacturing a three-dimensional object by layer-wise selective solidification of a pulverulent building material.

The device illustrated in FIG. 1 is a laser sintering or laser melting device 1 being basically known in the prior art. For manufacturing a object 2, it contains a process chamber 3 with a chamber wall 4.

In the process chamber 3, a building container 5 being open at the top and with a building container wall 6 is arranged. By the opening at the top of the building container 5, a working plane 7 is defined, wherein the area of the working plane 7 lying within the opening, which can be used for building the object 2, is referred to as build area 8.

In the building container 5, a support 10 being movable in a vertical direction V is arranged to which a base plate 11 is attached which closes the building container 5 towards its underside and therefore forms its bottom. The base plate 11 may be plate which is formed separately from the support 10 which is fastened to the support 10 or it may be formed monolithically with the support 10. Depending on the building material used and the process used, in addition a building platform 12, on which the object 2 is built, may be attached to the base plate. The object 2 may, however, also be built on the base plate 11 itself which then serves as building platform. In FIG. 1, the object 2 to be formed on the building platform 12 in the building container 5 below the working plane 7 is shown in an intermediate state having a plurality of solidified layers and being surrounded by non-solidified building material 13.

The building container 5 may also be configured as an exchangeable container which can be taken out of the device 1 for manufacturing three-dimensional object and inserted in a cooling device according to the invention to be described in more detail further below. Then, the building container 5 may serve as cooling container in the cooling device.

The laser sintering device 1 further comprises a storage container 14 for a pulverulent building material 15 being solidifiable by electromagnetic radiation and a recoater 16 being movable in a horizontal direction H for applying the building material 15 within the build area 8. Preferably, the recoater 16 extends over the entire area to be coated in a direction traverse to its movement direction.

Optionally, a radiation heater 17 which serves for heating the applied building material 15, is arranged in the processing chamber 3. As the radiation heater 17, an infrared lamp may for example be provided.

Further, the laser sintering device 1 comprises an irradiation device 20 with a laser 21 which generates a laser beam 22 which is deflected by a deflecting device 23 and which is focused on the working plane 7 by a focusing device 24 via a coupling window 25 which is provided at the top of the processing chamber 3 in the chamber wall 4.

Further, the laser sintering device 1 comprises a control unit 29 by way of which the individual component parts of the device 1 are controlled in a coordinated manner for carrying out the process for manufacturing a three-dimensional object 2. As an alternative, the control unit 29 may partially or entirely be arranged outside of the device 1. The control unit may include a CPU, the operation of which is controlled by a computer program (software). The computer program may be stored on a storage medium separate from the device, from where it may be loaded into the device 1, especially into the control unit.

In operation, for applying a powder layer, first the support 10 is lowered by a height which corresponds to the desired layer thickness. The recoater 16 is first moved to the storage container 14 and withdraws from it an amount of building material 15 being sufficient for applying a layer. Then, it moves across the build area 8 and there, it applies a thin layer of the pulverulent building material 15 on the building base or an already present powder layer. The application is carried out at least across the entire cross-section of the object 2 to be manufactured, preferably across the entire build area 8, i.e. the area of the building plane 7 being delimited by the container wall 6. Optionally, the pulverulent building material 15 is heated by use of the radiation heater 17 to a working temperature.

Subsequently, the cross section of the object 2 to be manufactured is scanned by the laser beam 22 such that the pulverulent building material 15 is solidified at the locations that correspond to the cross section of the object 2 to be produced. In doing so, the powder grains at those locations are partially or entirely melted by the energy which is introduced by the radiation so that after cooling, they are agglutinated to each other as a solid body.

These steps are repeated until the object 2 is finished.

Subsequently, the manufactured three-dimensional object 2 and the non-solidified building material 13 in which the three-dimensional object 2 is embedded are cooled. Herein, the cooling preferably takes place outside of the process chamber 3. In doing so, the process chamber may be available for the manufacture of a further three-dimensional object during the cooling.

Figure 2:
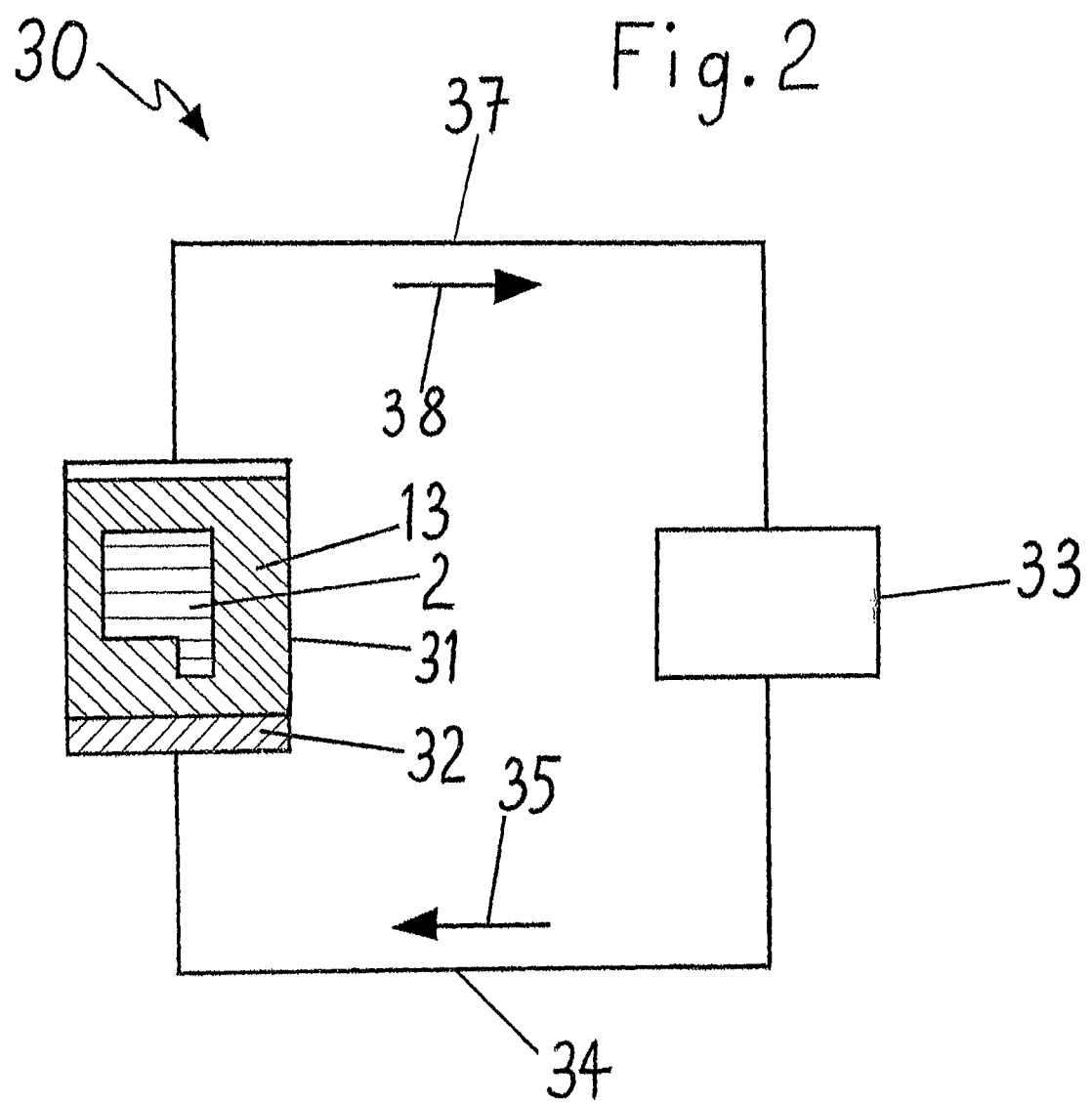
FIG. 2 as a schematic view, partially represented as cross-section, of a cooling device according to a first embodiment of the present invention.

In FIG. 2, a cooling device 30 according to a first embodiment of the present invention is represented schematically. The cooling device 30 comprises, in this embodiment, as a cooling container 31 the building container 5 configured as an exchangeable container which is intended to accommodate in its interior the three-dimensional object 2 and the non-solidified building material 13 into which the three-dimensional object 2 is embedded. The cooling container 31 is adapted to be permeable for the fluid medium in the region of its bottom through a fluidization plate 32.

In order to improve the contact between the fluid medium and the non-solidified building material 13 in the interior of the cooling container and/or in order to fluidize the non-solidified building material at least partially, in the region of the bottom of the cooling container 31, a fluidization plate 32 is provided through which the fluid medium is led in the interior of the cooling container 31.

Further, the cooling device 30 comprises a preparation unit 33 for preparing the fluid medium. Preferably, he preparation unit 33 is a humidifier, more preferably a sprayer, adapted to enrich a carrier gas with a liquid.

Further, the cooling device 30 comprises a first conduit 34 for conducting the fluid medium from the preparation unit 33 to the portion being permeable for the fluid medium such that the fluid medium can be directed from the preparation unit 33 in the interior of the cooling container 31 and come into contact with the non-solidified building material 13 and the manufactured object 2. The direction of flow from the preparation unit 33 to the cooling container 31 is indicated by the arrow 35 in FIG. 2.

In addition, the cooling device 30 comprises a second conduit 37 for conducting the fluid medium coming out of the cooling container 31 to the preparation unit. The direction of the gas flow in the second conduit 37 is indicated by the arrow 38. The fluid medium is at least partially conducted in a circular flow in cooling device, i.e. fluid medium is directed through the first conduit 34 from the preparation unit 33 in the cooling container 31 and, after it has come out of the cooling container 31 again, directed back to the preparation unit 33 through the second conduit 37.

In an alternative embodiment (not illustrated in the drawings), fluid medium coming out of the cooling container 31 is not directed back in the preparation unit 33 but discarded.

Figure 3:
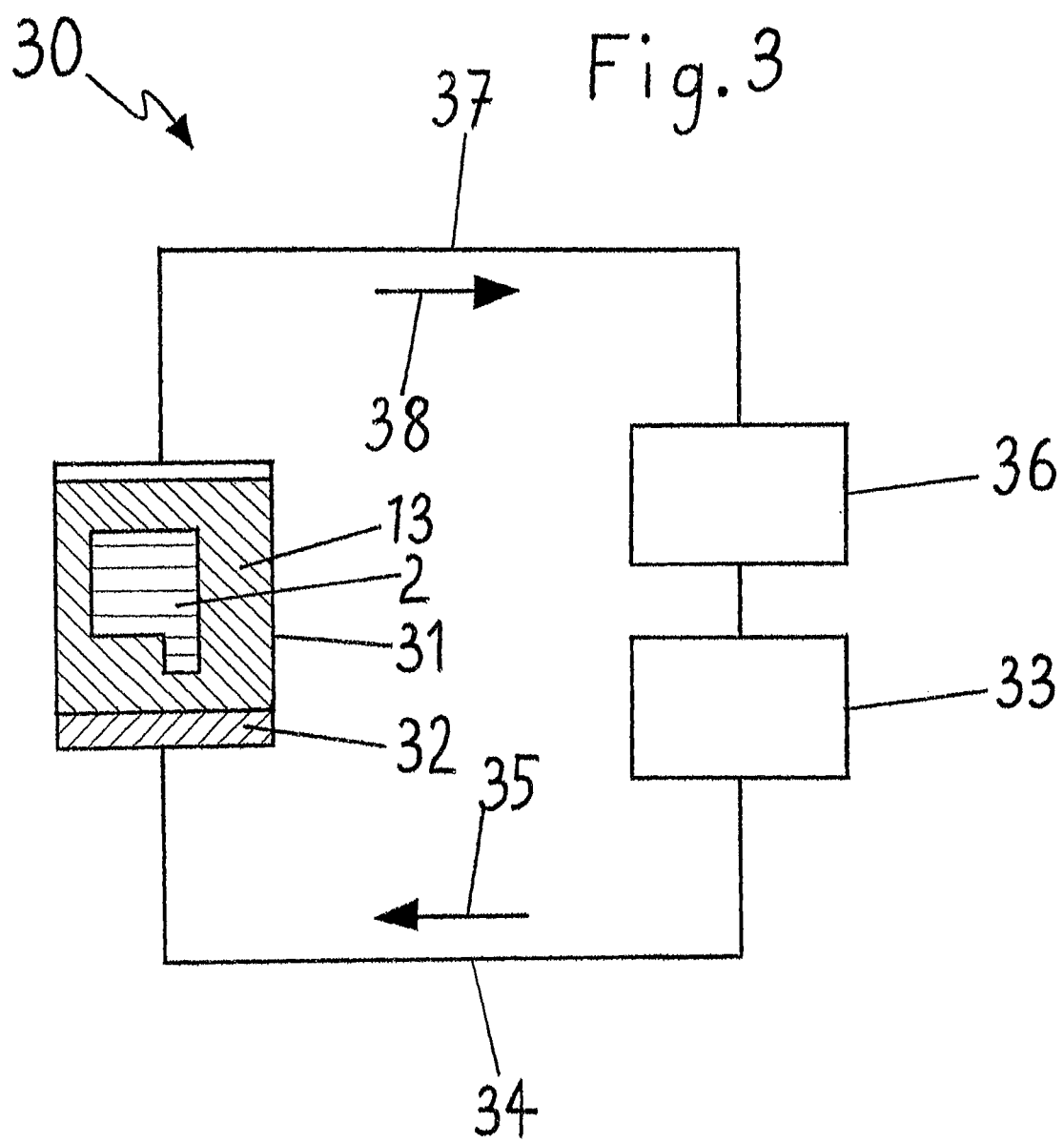
FIG. 3 as a schematic view, partially represented as cross-section, of a cooling device according to a second embodiment of the present invention.

In FIG. 3, a cooling device 30 according to a second embodiment of the present invention is schematically represented. The cooling device comprises a filter 36 arranged ahead of the preparation unit 33 in the direction of flow (arrows 35, 38). By use of this filter, solids and/or liquid droplets are removed from the fluid medium before the fluid medium enters the preparation unit 33 such that these solids and/or liquid droplets do not come into the preparation unit 33 and do not contaminate or even obstruct the same.

The fluid medium is preferably conducted in a circular flow in the cooling device. By filtering the fluid medium by use of the filter 36, it is prevented that powder particles and/or other solids and/or liquid droplets which are carried off from the interior of the cooling container 31 by the fluid medium come into the preparation unit 33 and contaminate or even obstruct the same.

Figure 4:
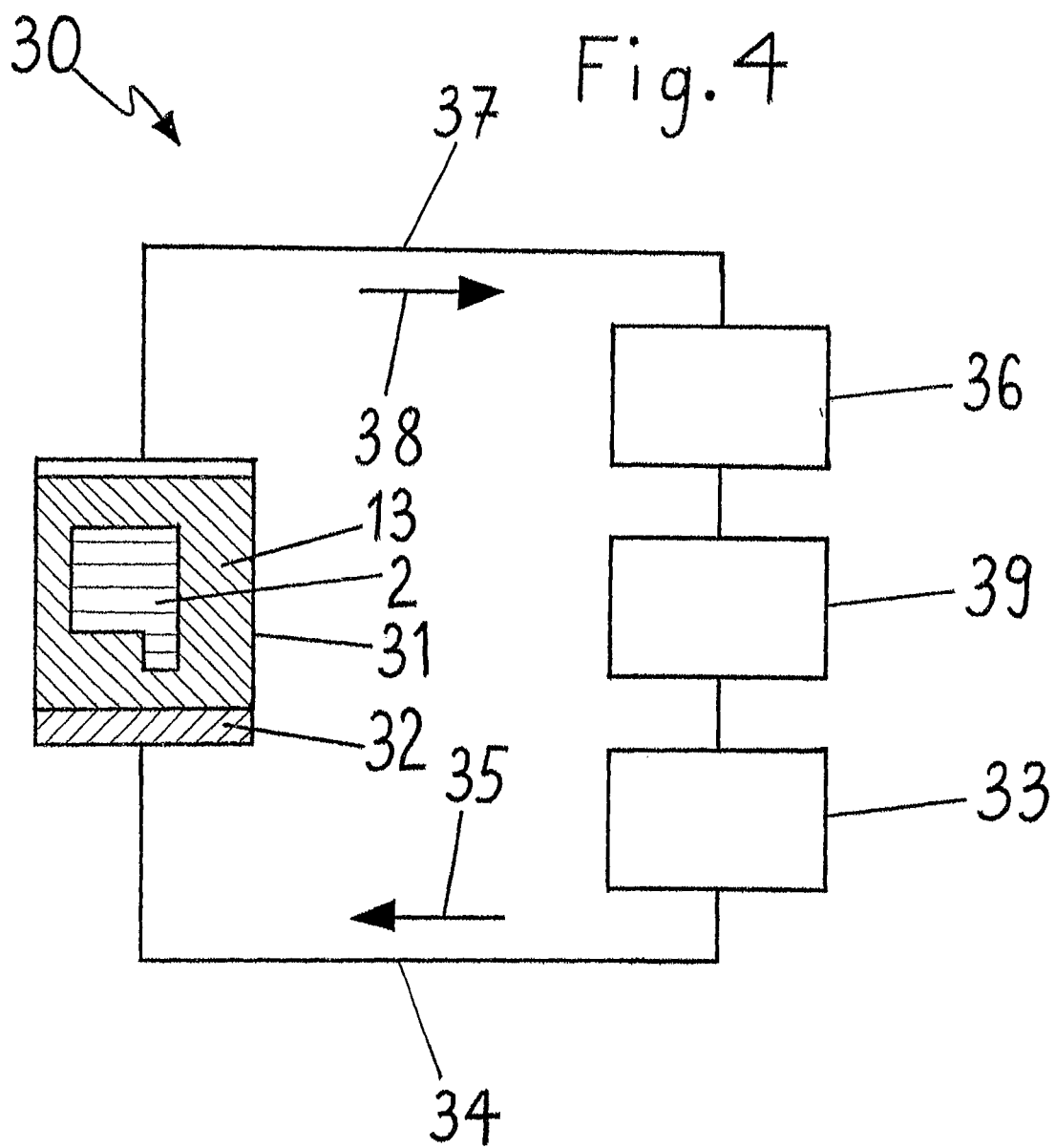
FIG. 4 as a schematic view, partially represented as cross-section, of a cooling device according to a third embodiment of the present invention.

In FIG. 4, a cooling device 30 according to a third embodiment of the present invention is schematically represented. The cooling device 30 comprises a compressor 39, for example a pump, which is arranged ahead of the preparation unit 33 and after the filter 36 in the direction of flow (arrows 35 and 38). By use of the compressor 39, a circular flow of the fluid medium is generated in the cooling device.

In FIG. 5, a cooling device 30 according to a fourth embodiment of the present invention is schematically represented. The preparation unit 33 comprises a container which can accommodate a liquid 44 in its interior and sprayer 43. By use of this sprayer, a carrier gas which is for instance conveyed through the preparation unit 33 by a compressor (not illustrated in FIG. 5) is enriched with a liquid 44.

When a fluid medium is flowing through a powder bed, the formation of cracks in the powder bed can occur. In order to avoid the formation of cracks in the powder bed formed by the non-solidified building material 13 or in order to close cracks having formed, respectively, the cooling device 30 optionally comprises a shaking unit 40, which preferably comprises a vibrator and/or beater, in the region of the wall of the cooling container 31. Alternatively or additionally (not illustrated in the drawings) shaking plate on which the cooling container 31 is arranged can be provided as shaking unit 40.

The cooling container 31 comprises a exchangeable container 41 which is closed at the top by cover 42. The second conduit 37 through which the fluid medium can exit the cooling container 31 is connected to the cover 42; apart from that, the cover closes the cooling container 31 substantially gas tight.

The exchangeable container 41 is the building container 5, in which three-dimensional object has been manufactured by layer-wise selective solidification of a pulverulent building material 13.

Alternatively, the building container 5 cooling container 31 can be different from each other. The three-dimensional object 2 to be cooled and non-solidified building material 13 to be cooled are in this case transferred from the building container 5 into the cooling container 31 before the method for cooling according to the invention is carried out.

Alternatively, the cooling container 31 could also be configured such that it can accommodate the building container 5 in its interior. In this case, the building container 5 together with the three-dimensional object 2 to be cooled and the non-solidified building material 13 to be cooled is brought into the cooling container 31 before the method for cooling according to the invention is carried out.

In a further embodiment of the cooling device 30 according to the invention not illustrated in the drawings, the cooling device has at least one compressor which is arranged ahead of the filter 36 and/or behind the preparation unit 33 in addition or as an alternative to a compressor 39 which is arranged ahead of the preparation unit 33 and behind the filter 36.

In an embodiment of the method according to the invention, the building container 5, in the interior of which a manufactured three-dimensional object, and the non-solidified pulverulent building material 13 in which the three-dimensional object 2 is embedded, are present, is taken out of the laser sintering or laser melting device 1 and inserted into the cooling device 30 as cooling container 31. A fluid medium is led into the interior of the cooling container 31 through the fluidization plate 32 in order to treat the non-solidified building material 13 and the three-dimensional object 2 in the interior of the cooling container 31. In doing so, the fluid medium flows through cooling container 31 and therefore through the powder bed formed by the non-solidified building material 13 from the bottom and the latter is at least partially fluidized.

At the beginning of the execution of the method according to the invention, in the illustrated embodiment, the fluid medium is prepared in the preparation unit 33 by bringing nitrogen which has room temperature into contact with liquid water which also has room temperature, for example by use of a sprayer 43. In this way, the nitrogen is almost or completely saturated with water.

The fluid medium is led through the conduit 34 in to the cooling container 31 and brought into contact with the non-solidified building material 13 to be cooled and the three-dimensional object 2 to be cooled, whereby the fluid medium becomes warmer. In addition, the fluid medium releases water in the interior of the cooling container 31.

The fluid medium is conducted in the circular flow in the cooling device 30, whereby the fluid medium which comes out of the cooling container 31 is conducted through the conduit 37 into the preparation unit 33, in which the fluid medium takes up water again until a saturation with water is almost or completely reached. In the preparation unit 33, the temperature of the fluid medium may thereby decrease again.

In a specific example, the humidity of non-solidified building material 13 which had been cooled together with a three-dimensional object manufactured by laser sintering according to the above-described embodiment of the inventive method (building material cooled according to the invention) was measured with a humidity measurement device comprising a capacitive humidity sensor. The non-solidified building material was a polyamide-12 powder with a mean grain size d50 from 50 to 65 µm which is for example distributed by EOS GmbH Electro Optical Systems under the trade name "EOS PA2200". The cooling happened during a period of time off about 10 hours in which the fluid medium continuously flowed through the non-solidified building material. The fluid medium was a nitrogen gas saturated with water. The measurement gave the result of a humidity of 22.1%. The humidity measurement device used ("humidity lance") has a measurement tip which is held into the non-solidified building material for the measurement of the humidity.

In order to obtain a comparative value, the humidity of non-solidified building material 13 which had been allowed to cool together with the three-dimensional object 2 in the interior of the laser sintering device over a period of time of 18 hours (building material 13 not cooled according to the invention) was measured with the same humidity measurement device. The measurement gave the result of the humidity of 6.2%.

The inventive methods therefore has the result that the non-solidified building material has a significantly higher humidity, i.e. a significantly higher water content. In this way, a non-solidified building material 13 is obtained that can be better handled, especially better sieved.

In addition, non-solidified building material 13 is obtained by the inventive method which is better suited for reuse as, for the specific example, a comparison of the following values for the melt volume index (MVR as an abbreviation of the English term "Melt Volume-flow Rate") reveals: For the building material 13 cooled according to the invention, a MVR value of 12.51 $cm^3/10$ min was obtained, whereas for the building material 13 not cooled according to the invention, under the same measurement conditions, a MVR value of 8.08 $cm^3/10$ min was obtained. A higher MVR value is equivalent to a better reusability of the pulverulent building material. Herein, the MVR values were measured according to the provisions of the standard ISO 1133:2011.

The features of the embodiments described above may, as far as practicable, be combined with one another and modified.

By the invention, it is possible to stop the degradation of the solidified building material 13, whereby the refreshment rate can be reduced.

By the invention, it is furthermore realizable to cool non-solidified building material 13 faster and, thereby, to reduce the duration of the cooling of a three-dimensional object 2 manufactured by layer-wise selective solidification of pulverulent building material and non-solidified building material 13 in which the three-dimensional object is embedded.

By the invention, it is furthermore possible to introduce humidity into the non-solidified building material 13 such that the non-solidified building material 13 is electrostatically charged to lower degree or not at all. In this way, the operability of the non-solidified building material 13 is improved. In particular, the sieving of the non-solidified building material 13 after the cooling is facilitated.

According to the invention, the cooling by tweeting with the fluid medium is performed. In doing so, the fluid medium may be formed by a carrier gas which is specifically enriched with a further gas and/or a liquid. That means that the fluid medium is a gas mixture or an aerosol with a composition which is adjusted by adding a further gas and/or liquid in a predetermined manner (specifically). The terms "to enrich with a gas" and "to enrich with a liquid" have the meaning that a further gas (gaseous pure substance or gaseous mixture) or liquid (liquid pure substance or liquid mixture) is added to the carrier gas, wherein the aggregate state of the additive added to the carrier gas prior to the addition is decisive and not whether the additive has this aggregate state after the addition.

The fluid medium can also be constituted by a gas mixture from which specifically at least one mixture components is at least partially withdrawn, i.e. the fluid medium can be a gas whose composition is adjusted in a predetermined manner (specifically) by partial or complete withdrawal of one or more mixture components.

As carrier gas, preferably an inert gas, in particular $N_2$ (nitrogen) is used which is enriched with water for the preparation of the fluid medium. In this way, a fluid medium can be prepared from easily available, low-prized and economically friendly starting materials, by the use of which the advantages of the present invention described above are particularly pronounced. Alternatively, for example argon may be used as carrier gas.

The inventive method has turned out to be particularly useful if the building material comprises a polymer or consists of a polymer, respectively, because polymers are, at higher temperatures, sensitive to thermal or thermo-oxidative damages which reduce the reusability of the non-solidified material or make a reuse impossible. In addition, polymers in powder form tend to electrostatic charging.

Although the manufacture of at three-dimensional object was described above by laser sintering or laser melting, the invention is not restricted to cooling a three-dimensional object manufactured by laser sintering or laser melting and non-solidified building material in which such a three-dimensional object is embedded. It may be applied to the cooling of three-dimensional objects manufactured by any method for the generative manufacture and corresponding building materials.

The irradiation device may comprise for example one or more gas or solid state lasers or any other type of laser such as laser diodes, especially VCSEL (Vertical Cavity Surface Emitting Laser) or VECSEL (Vertical External Cavity Surface Emitting Laser), or an array of those lasers. In general, any device by which energy in form of wave or particle radiation can be selectively applied onto a layer of the building material may be used as an irradiation device. Instead of a laser, another light source, an electron beam or any other energy or radiation source which is suitable for solidifying the building material may be used, for example. Instead of the deflection of a beam, irradiation by means of a moveable row irradiator may be used. The invention may also be applied to selective mask sintering, in which a mask and an extended light source are used, or to high-speed sintering (HSS), wherein a material that increases (absorption sintering) or reduces (inhibition sintering) the absorption of the radiation at the corresponding positions is selectively applied on the building material, whereupon irradiation is unselectively carried out over a large-area or by means of a moveable row irradiator.

Various materials may be used as pulverulent building material, preferable plastic powders, metal powders, ceramic powders, sand, filled or mixed powders.

The invention claimed is:

1. A method for cooling a three-dimensional object manufactured by layer-wise selective solidification of a pulverulent building material and non-solidified building material in which the three-dimensional object is embedded, comprising:
providing a cooling container that contains the three-dimensional object and the non-solidified building material in which the three-dimensional object is embedded, the cooling container having a portion permeable for a fluid medium;
preparing the fluid medium in a preparation unit, comprising:
providing a carrier gas and specifically enriching the carrier gas with an additional component comprising a further gas and/or a liquid; and/or
providing a gas mixture and adjusting the composition of the gas mixture in a predetermined manner by partial or complete withdrawal of one or more mixture components;
passing the fluid medium through the portion permeable for the fluid medium into the cooling container and through the non-solidified building material in which the three-dimensional object is embedded;
conducting the fluid medium in a circular flow back to the preparation unit and enriching the carrier gas with the additional component and/or adjusting the composition of the gas mixture in the predetermined manner; and
again passing the fluid medium from the preparation unit through the portion permeable for the fluid medium into the cooling container and through the non-solidified building material in which the three-dimensional object is embedded.

2. The method according to claim 1, wherein the additional component comprises $H_2O$.

3. The method according to claim 2, wherein the $H_2O$ content of the additional component is at least 90 percent by weight.

4. The method according to claim 1, wherein the additional component comprises a surfactant.

5. The method according to claim 1, wherein the carrier gas comprises an inert gas.

6. The method according to claim 5, wherein the carrier gas comprises nitrogen.

7. The method according to claim 1, wherein the carrier gas is at least 50% saturated with the additional component.

8. The method according to claim 7, wherein the carrier gas is at least 80% saturated with the additional component.

9. The method according to claim 1, wherein at least a part of the liquid is distributed in the fluid medium in the form of droplets.

10. The method according to claim 1, wherein the fluid medium contains at least 10 grams per cubic meter and/or no more than 300 grams per cubic meter of the additional component.

11. The method according to claim 10, wherein the fluid medium contains at least 50 grams per cubic meter and/or no more than 200 grams per cubic meter of the additional component.

12. The method according to claim 1, wherein the fluid medium is led into an interior of the cooling container and brought into contact with the three-dimensional object and the non-solidified building material in the interior of the cooling container.

13. The method according to claim 1, wherein the building material comprises a polymer.

14. The method according to claim 13, wherein the building material comprises a polyaryletherketone and/or a polyamide.

15. The method according to claim 1, wherein the fluid medium flows through the non-solidified building material in which the three-dimensional object is embedded in a direction substantially inverse to the force of gravity and/or having an angle with respect to the force of gravity.

16. The method according to claim 1, wherein the portion permeable for the fluid medium comprises a fluidization plate.

17. The method according to claim 1, wherein the cooling container is a building container.

18. A method of cooling a three-dimensional object manufactured by layer-wise selective solidification of a building material and further cooling non-solidified building material in which the three-dimensional object is embedded, the method comprising:
providing a fluid medium including a carrier gas enriched with an additional component comprising a further gas and/or a liquid;

introducing the fluid medium into a cooling container that includes the non-solidified building material and the three-dimensional object through a portion of the cooling container permeable for the fluid medium;

circulating the fluid medium to cause further enrichment of the fluid medium by the additional component in an area separate from the cooling container; and re-introducing the fluid medium through the portion of the cooling container permeable for the fluid medium and into the cooling container.

19. The method according to claim 18, wherein the area separate from the cooling container is a preparation unit in which the fluid medium is enriched with the additional component.

* * * * *